United States Patent [19]

Watanabe et al.

[11] Patent Number: 4,971,867
[45] Date of Patent: Nov. 20, 1990

[54] CYLINDRICAL ORGANIC ELECTROLYTE BATTERY WITH A PTC DEVICE

[75] Inventors: Osamu Watanabe, Toyonaka; Osamu Kajii, Kashiwara; Yoshiki Somatomo, Osaka; Kaoru Hisatomi, Takatsuki, all of Japan

[73] Assignee: Hitachi Maxell, Ltd., Osaka, Japan

[21] Appl. No.: 476,535

[22] Filed: Feb. 7, 1990

[30] Foreign Application Priority Data

Feb. 7, 1989 [JP] Japan .................................. 1-027926

[51] Int. Cl.⁵ .............................................. H01M 2/00
[52] U.S. Cl. ........................................ 429/61; 429/94; 429/194

[58] Field of Search ...................... 429/194, 94, 56, 53, 429/90, 61, 62, 164, 7

[56] References Cited

U.S. PATENT DOCUMENTS 4,654,963  4/1987  Sugalski ............................ 429/94 X
4,740,433  4/1988  Lu ........................................ 429/94

Primary Examiner—Anthony Skapars
Attorney, Agent, or Firm—Birch, Stewart, Kolasch & Birch

[57] ABSTRACT

In a cylindrical organic electrolyte battery with a PTC device, the PTC device is attached to the bottom of the battery case through a metal plate so that the upper opening of the battery case can be tightly sealed.

3 Claims, 7 Drawing Sheets

CYLINDRICAL ORGANIC ELECTROLYTE BATTERY WITH A PTC DEVICE

BACKGROUND OF THE INVENTION

1. Field of the Invention

The present invention relates to an organic electrolyte battery, and more particularly to an organic electrolyte battery of a cylindrical shape with a PTC device for the protection of the battery.

2. Description of the Prior Art

In conventional cylindrical organic electrolyte batteries, as the negative electrode, lithium or a lithium alloy is used and, as the positive electrode, there is used a forming body of a positive electrode agent using an active material of metal oxide, such as manganese dioxide or metal hydrosulfide such as titanium dioxide. The negative electrode and positive electrode mentioned above are respectively shaped in the form of a sheet and laminated together through a separator and the laminated sheets are wound in a roll, which is contained in a cylindrical battery case. As the electrolyte there is used an organic electrolyte made of an organic solvent, such as propylene carbonate, tetrahydrofurane, dimethoxyethane or dioxilane containing solved lithium salt, such as lithium perchlorate.

As mentioned above, in the cylindrical organic electrolyte battery, the positive electrode and negative electrode are formed in a roll by winding both electrode sheets and the roll is accommodated in the container. The area of both electrodes is very large and there is a possibility of flowing a heavy current in the battery. If such a heavy current is continued, the battery temperature may be undesirably raised and the separator, made of a microcellular polypropylene film, may be harmed, thereby resulting in an inner shortcircuit of the battery. In the worst case, the battery may catch fire or may blow up.

In order to avoid such damage to the battery as mentioned above recently, it has become popular to attach a PTC device to each battery. In this arrangement, when a heavy current flows in the battery, the plastic resin layer of the PTC device becomes hot and the resistance of the hot resin layer of the PTC device becomes high, thereby suppressing the heavy current flow.

The conventional PTC device 2 mentioned above, as shown in FIG. 1, essentially consists of a resin layer 2a having a PTC characteristic and two metal layers 2b1 and 2b2 provided on both surfaces of the resin layer 2a, as shown in FIG. 2 with respect to the embodiment of the present invention. Such PTC devices are commercially sold from RAYCHEM CORPORATION with the trade name "polyswitch". PTC is an abbreviation of "Positive Temperature Coefficient" and the expression "PTC property" as used herein means such property that the electric resistance of the device increases extremely when the PTC device is heated.

In the conventional cylindrical organic electrolyte battery with the PTC device, which are commercially available, the PTC device 2 is installed in a sealing member 18, as shown in FIG. 1.

It seems that such a structure, as mentioned above, is adopted because, when the PTC device is disposed in the sealing member 18, it is not necessary to heat the PTC device and the resin layer 2a of the PTC device 2 is not thermally deteriorated and therefore the PTC characteristic of the PTC device is not harmed.

There are further problems in the conventional battery with the PTC device as mentioned below. In the cylindrical organic electrolyte battery, gas is generated inside of the battery due to an internal shortcircuit of the battery, whereby the internal gas pressure of the battery abnormally rises and the battery may explode. In order to prevent such battery explosion, there is provided a flexible, thin sheet 21 in the sealing member 18 and, in addition, a cutting blade 22a and a gas ventilation port 22b are formed on a terminal plate 22. Further, a gas ventilation opening 19a is defined in the sealing plate 19. Therefore, the PTC device 2 must be made in a round shape. Furthermore, since the PTC device 2 must be disposed in the sealing member 18, the sealing property of the sealing member 18 may deteriorate and the PTC device 2 can not be operated as desired due to an inner shortcircuit. When the gas is generated in the battery, the gas reaches the flexible thin sheet 21 through the gas ventilation opening 19a of the sealing plate 19 pushing up the central portion of the flexible thin sheet 21. The pushed up portion of the flexible thin sheet 21 comes into contact with the cutting blade 22a and is broken., thereby allowing the gas generated in the battery to pass toward the outside of the battery through the ventilation port 22b, so that the battery can be prevented from exploding. However, in order to assure the normal operation of the explosion preventing device, such as the breakage of the flexible thin sheet 21, it is necessary to arrange the PTC device 2 in such a manner that the PTC device 2 does not prevent the upward deformation of the flexible thin sheet 21 when the gas is generated in the battery. Therefore, the PTC device 2 must be shaped in a circular shape. As a result, the effective area of the PTC device becomes small and the resistance thereof must be high, therefore, the internal resistance of the battery increases.

In addition, in order to cause the current to flow through the PTC device 2 before the current reaches the terminal plate 22, it is necessary to avoid a direct contact between the sealing plate 19 and the terminal plate 22. For this purpose, in the conventional method, there is disposed an insulation packing 26 in the sealing member 18 so as to cover the PTC device 2 and the outer periphery of an annular metal plate 27, having the flexible thin sheet 21 contacted with the sealing plate 19, which is arranged so as not to directly or electrically contact the terminal plate 22 in addition, the flexible thin sheet 21 contacts the metal plate 27, so that the current can flow through a path consisting of the sealing plate 19, flexible thin sheet 21, metal plate 27, PTC device 2, and terminal plate 22, in the order as described. The sealing member 18 is assembled, fastening the insulation packing 26 by bending the peripheral edge portion of the sealing plate 19 toward the inside of the battery. In this structure, since the PTC device 2 is shaped as a plate, the flanged edge portion of the terminal plate 22 must be a flat plate shape. In addition, since the insulation packing 26 is not disposed between the peripheral edge portion of the sealing plate 19 and the peripheral edge portion of the flexible thin sheet 21, sealing of the sealing member 18 tends to be lowered, whereby the electrolyte of the battery is apt to leak outside of the battery passing the interface between the insulation packing 26 and the metal plate 27 or PTC device 2, further passing the gas ventilation port 22b.

Moreover, the resin layer 2a of the peripheral edge portion of the PTC device 2 tends to be crushed by the fastening force applied at the time of assembling the sealing member 18, whereby the metal layers 2b1 and 2b2 disposed on both surfaces of the resin layer 2a, contact, resulting in an inner shortcircuit and the PTC function may be lost.

SUMMARY OF THE INVENTION

The present invention is made to eliminate the various drawbacks such as limitation of the shape of the PTC device and deterioration of the sealing effect and internal shortcircuiting inherent in the conventional batteries of this kind. An essential object of the present invention, therefore, is to provide a cylindrical organic electrolyte battery with a PTC device having a tight sealing without inner shortcircuiting.

In order to accomplish the object mentioned above, according to the present invention, a metal plate is attached to a PTC device, and the metal plate is bonded to the bottom of the battery.

The following examples (1) to (3) may be employed for embodying the above structure of the present invention. (1) A metal plate which is larger than the PTC device is secured to one metal layer of the PTC device and the PTC device is attached to the bottom of the battery by welding the peripheral edge portions of the metal plate jutting from the PTC device. (2) One end portion of the metal plate is secured to one of the metal layers of the PTC device with another end portion of the metal plate secured to the bottom of the battery by welding, in addition to forming an overlapping portion at the intermediate portion of the metal plate by folding, so that the PTC device and the metal plate are positioned within an area defined by the outer periphery of the bottom of the battery or on a portion corresponding to the periphery thereof, so that the PTC device is not positioned outside of the area of the bottom of the battery. (3) A slit is defined in the metal plate, one area of the metal plate defined by the slit being secured to one metal layer of the PTC device and another area of the metal plate defined by the slit being secured to the bottom of the battery by welding.

The PTC device essentially consists of a resin layer having a PTC property and metal layers attached to both opposite surfaces of the PTC layer and the metal layers acting as the connection terminals of the PTC device may be bonded to a metal plate normally by soldering. However, so far as the PTC property is not badly harmed, the metal layer of the PTC device may be secured to the metal plate by spot welding.

Usually, the metal plate is connected to the bottom of the battery by spot welding. This is because the spot welding enables limiting the heat of welding in an area to be connected as near as possible so as to decrease undesired effect of the heat against on the PTC device.

The arrangements (1), (2) and (3) mentioned above enable to connecting of the metal plate to the bottom of the battery at a position remote from the PTC device, avoiding is the PTC resin layer from being badly affected by the heat of welding.

By disposing the PTC device at the bottom of the battery, as described in features (1) to (3), it becomes possible to remove the restriction that the PTC device must be in a round ring shape. In addition, in the features mentioned above, since the PTC device is not assembled in the sealing member, deterioration of the sealing property in the sealing member can be prevented, whereby it becomes possible to manufacture the batteries having a tight seal. Moreover, shortcircuit of the PTC device can be prevented and the normal operation of the PTC device can be assured. Yet, the work of welding and connecting the metal plate to the bottom plate of the battery can be conducted remotely from the PTC device, thus the resin layer of the PTC device is prevented from being deteriorated, whereby a good PTC property can be assured.

DETAILED DESCRIPTION OF THE PREFERRED EMBODIMENTS

Embodiment 1

Figure 2:
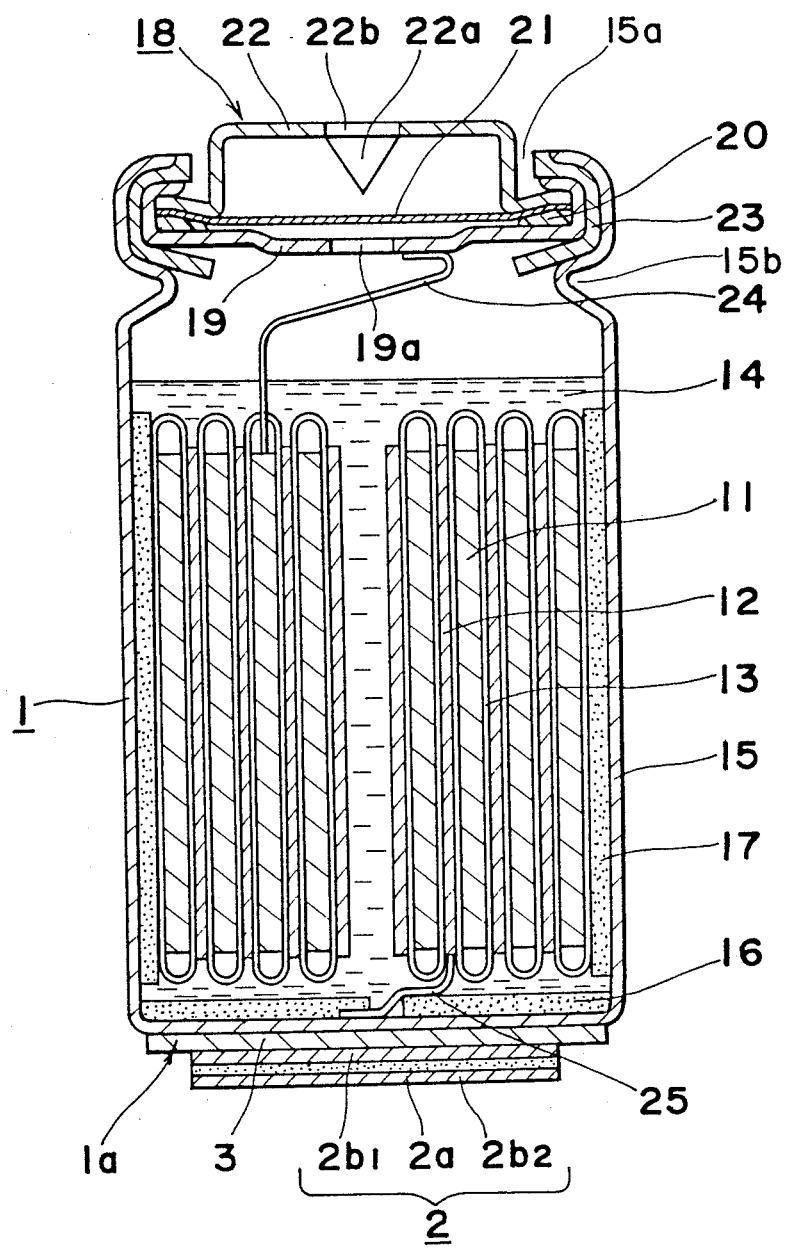
FIG. 2 is a cross sectional view of a first embodiment of a cylindrical organic electrolyte battery with a PTC device according to the present invention.

Referring to FIG. 2 showing a first embodiment of a battery according to the present invention, there is shown a battery 1, a PTC device 2 and a metal plate 3.

The PTC device 2 is disc shaped made by Raychem corporation with a 12 mm in diameter and 0.6 mm thick. The PTC device 2 is composed of a resin layer 2a and a pair of metal, layers 2b1 and 2b2 formed on both surfaces of the resin layer 2a. The metal layers 2b1 and 2b2 are formed by bonding two sheets of a nickel plates to both surfaces of the resin layer 2a by thermocompression bonding.

The metal plate 3 is made of a nickel disc with 0.06 mm thick and 15.9 mm diameter. However, the metal plate 3 may be made of any kind of metal such as a stainless steel sheet.

The battery 1 is a cylindrical organic electrolyte battery of 16 mm diameter and 32 mm high.

Figure 4:
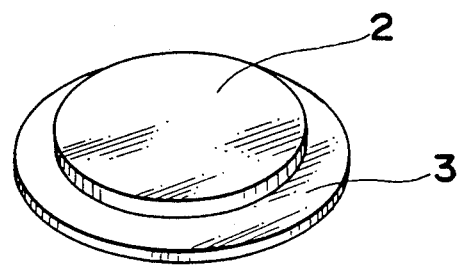
FIG. 4 is a perspective view of a PTC device attached to a metal plate with the axis coincided.
Figure 5:
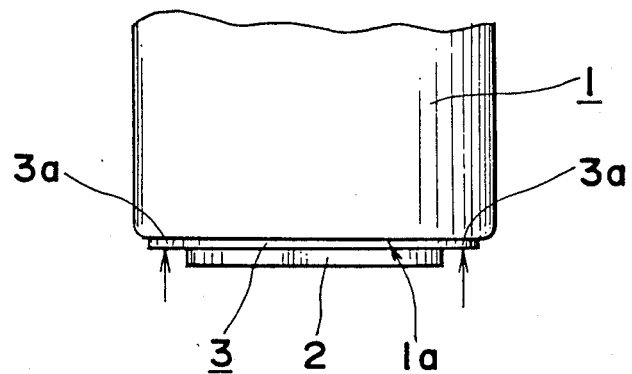
FIG. 5 is a front view of a bottom portion of the battery in which the metal plate is welded to the bottom of the battery.

The PTC device 2 is disposed on one surface of the metal plate 3 coaxially, as shown in FIG. 4, and the metal plate 3 and one of the metal layers 2b1 (or 2b2) of the PTC device 2 are bonded together by soldering.

The surface of the metal plate 3 on which the PTC device 2 is not provided is tightly contacted to the bottom 1a of the battery 1 and the projected portion 3a of the metal plate 3 projected outward beyond the PTC device 2 is bonded to the bottom 1a of the battery 1 by spot welding under the condition 15WS using a resistance welding machine, so that the metal plate 3 and PTC device 2 are secured to the bottom of the battery 1.

By assembling the PTC device 2 as mentioned above, there is prepared the first embodiment of the cylindrical organic electrolyte battery with PTC protection, as shown in FIG. 2.

In order to examine the effect of the heat of the spot welding on the PTC device, the internal resistance of the PTC device was measured after the PTC device 2 was secured to the battery 1. The internal resistance of the PTC device was 30 miliohm which was not changed from the resistance of the PTC device before the PTC device was secured to the battery. Thus, it is apparent that the property of the resin layer of the PTC device is not affected by the heat of the spot welding.

The structure of the battery 1 is now explained in detail. The battery 1 comprises a positive electrode 11 using manganese dioxide as the positive active substance a negative electrode 12 made of lithium, and a separator 13 made of microcellular polypropylene film. The positive electrode 11 and the negative electrode 12 are overlapped through the separator 13 and wound in a roll. Specifically, the positive electrode 11 is formed in such a manner that the positive electrode agent which is made of manganese dioxide as the positive active substance is formed in a sheet shape using a core which is made of a stainless steel mesh acting as an electric collecting member, whereby the positive electrode sheet is enclosed in the separator 13 formed in a bag shape. The negative electrode 12 is made in such a manner that a lithium sheet is bonded to a stainless steel mesh acting as an electric collecting member. The negative electrode 12 is laid on the positive electrode 11 through the separator 13 and wound in a roll. It is noted that the respective stainless steel meshes in the positive electrode and negative electrode are omitted in FIG. 2 for the sake of brevity.

The electrolyte 14 is an organic solution made by solving $LiClO_4$ in a solution of a mixture of propylene carbonate and tetra hydrofuran.

The battery case 15 is made of stainless steel having on the inner face of its bottom an insulation polytetrafluoroethylene sheet 16. The generator parts of the battery including the positive electrode 11, negative electrode 12, separator 13 and the electrolyte 14 are accommodated in the battery case 15. It is noted that the bottom 1a of the battery 1 indicates the outer bottom surface of the battery case 15.

A sealing member 18 essentially consists of a sealing plate 19, a packing 20 of a round ring shape, a flexible thin sheet 21 and a terminal plate 22. The sealing plate 19 is made of a stainless steel sheet having its central portion defining a gas ventilation hole 19a. The packing 20 is made of polypropylene and the flexible thin sheet 21 is made of titanium. The terminal plate 22 is plated by nickel and the blade 22a is raised and the gas discharging port is defined therein.

Near the upper opening 15a of the battery case 15, a slot 15b is formed by constricting the battery case 15 after the generator parts are installed in the battery case 15. In the opening 15a of the battery case 15, the sealing member 18 comprising the sealing plate 19, packing 20, flexible thin sheet 21 and terminal plate 22 is assembled in the battery case 15 through an insulation packing 23 and the upper edge portion of the battery case 15 is bent inwardly, whereby the battery is formed in a tight sealed structure. The positive electrode 11 and the sealing plate 19 are electrically connected through a lead member 24 and the negative electrode 12 and the battery case 15 are electrically connected by a lead member 25.

Embodiment 2

Figure 6:
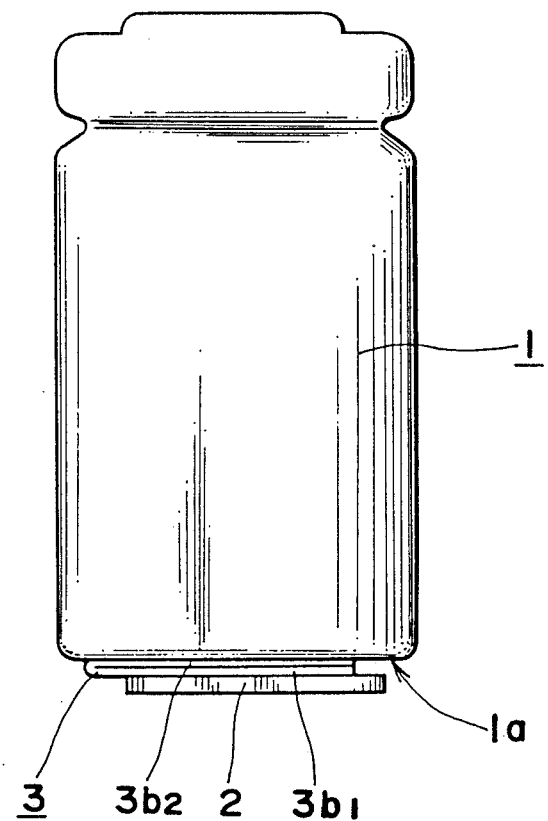
FIG. 6 is a front view of a second embodiment of the battery according to the present invention.

FIG. 6 shows the second embodiment of the cylindrical organic electrolyte battery with a PTC device.

Figure 3:
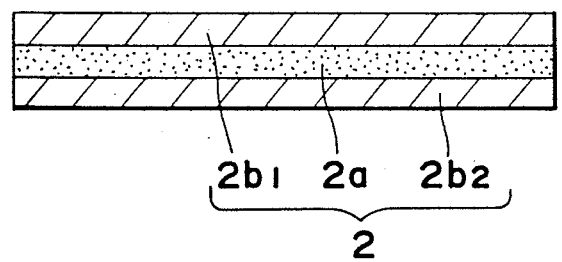
FIG. 3 is an enlarged cross sectional view of a PTC device used in the battery according to the present invention.

The PTC device 2 has the same structure in cross sectional view as shown in FIG. 3 used in the embodiment 1.

The battery 1 is the same as used in the embodiment 1.

Figure 7:
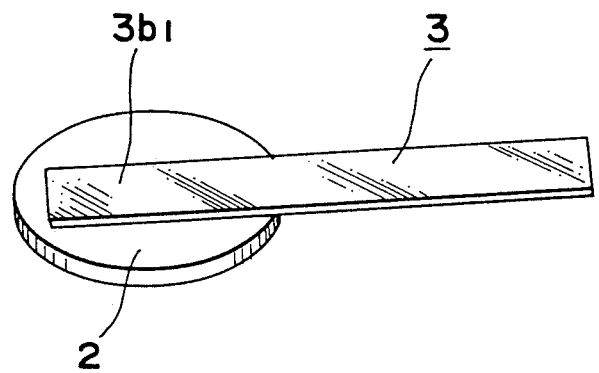
FIG. 7 is a perspective view of an arrangement of the PTC device and metal plate used in the second embodiment.
Figure 8:
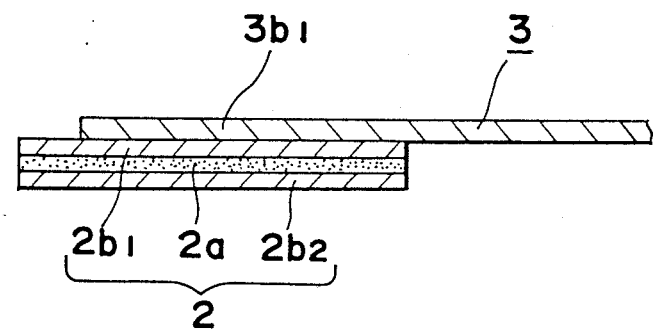
FIG. 8 is a cross sectional view of the arrangement shown in FIG. 7.

As the metal plate 3, there was used a nickel plate of rectangular shape 0.06 mm thick, 6 mm wide and 20 mm long and one end portion 3b1 of the metal plate 3 was laid on the PTC device 2, as shown in FIG. 7, and the end portion 3b1 was bonded to the metal layer 2b1 of the PTC device 2, as shown in FIG. 8.

Figure 9:
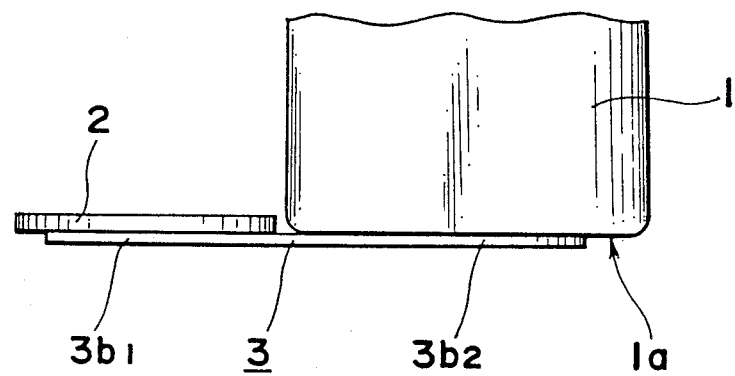
FIG. 9 is a front view showing a condition wherein another end portion of the metal plate shown in FIG. 7 is welded to the bottom of the battery.

Subsequently, as shown in FIG. 9, another end portion 3b2 of the metal plate 3 was tightly contacted to the bottom 1a of the battery 1 and bonded by spot welding using a resistance welding machine with a condition of 15WS; thereafter, the metal plate 3 was folded at its intermediate portion so as to overlap the respective halves of the metal plate 3, as shown in FIG. 6, whereby the PTC device 2 and the metal plate 3 were accommodated within the area defined by the diameter of the battery, so that the PTC device 2 and the metal plate 3 are not projected beyond the outer periphery of the cylindrical surface of the battery.

Embodiment 3

Figure 10:
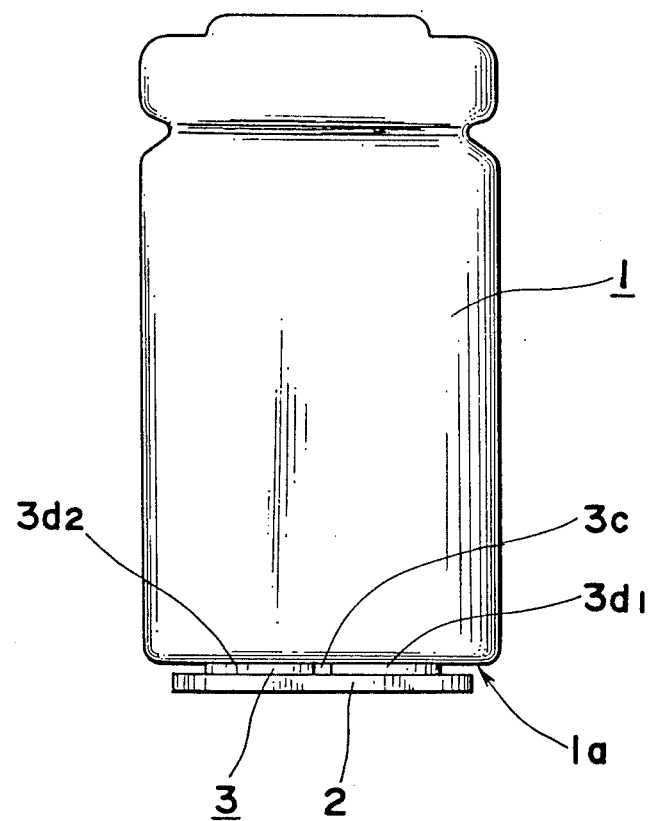
FIG. 10 is a front view of a third embodiment of the battery according to the present invention.

FIG. 10 shows the third embodiment of the battery according to the present invention, in which the PTC device 2 and the battery 1 were the same as those used in the embodiment 1.

Figure 11:
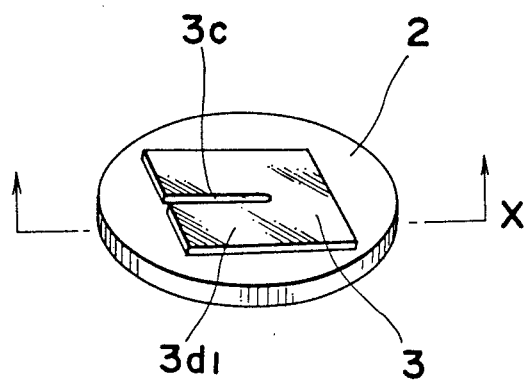
FIG. 11 is a perspective view showing a condition in which the metal plate is attached to the PTC device.
Figure 12:
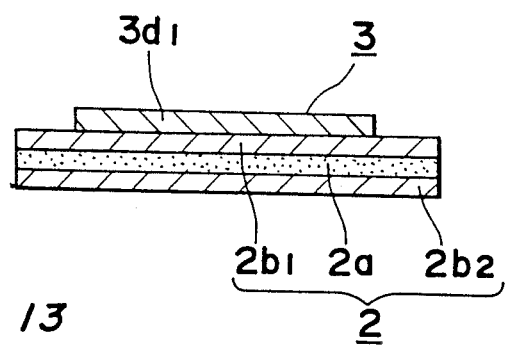
FIG. 12 is a cross sectional view taken along the lines X—X in FIG. 11.

As the metal plate 3, there was used a nickel plate 0.06 mm thick, 11 mm×11 mm long in longitudinal and lateral directions with a slit 3c defined at the central portion in terms of the longitudinal direction of the metal plate so as to extend in the lateral direction from one edge to 7 mm before the opposite edge. The metal plate 3 was laid on the PTC device 2, as shown in FIG. 11.

Subsequently, one end portion 3d1 which was a half of the metal plate 3 divided by the slit 3c was bonded to the PTC device 2 by soldering.

Figure 13:
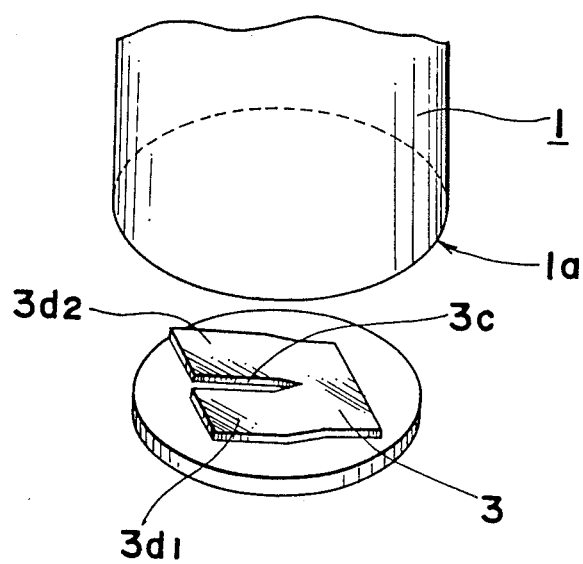
FIG. 13 is a perspective view showing a condition wherein one portion of the metal plate is raised for welding the metal plate to the bottom of the battery.

Subsequently, as shown in FIG. 13, another half portion 3d2 of the metal plate 3 divided by the slit 3c was raised and was tightly contacted to the bottom 1a of the battery 1 and bonded by spot welding under the condition of 15WS by a resistance welding machine. The metal plate 3 was pushed to the bottom 1a of the battery 1 through the PTC device 2.

The remaining structure of the battery is the same as that in the first embodiment.

In order to examine the effect of the heat of the spot welding against the PTC device, the internal resistance of the PTC device was measured after the PTC device 2 is secured to the battery 1. The internal resistance of the PTC device was 30 miliohm which was not changed from the resistance of the PTC device before the PTC device was secured to the battery. Thus, it is apparent that the property of the resin layer of the PTC device is not affected by the heat of the spot welding.

COMPARATIVE EXAMPLE 1

Figure 1:
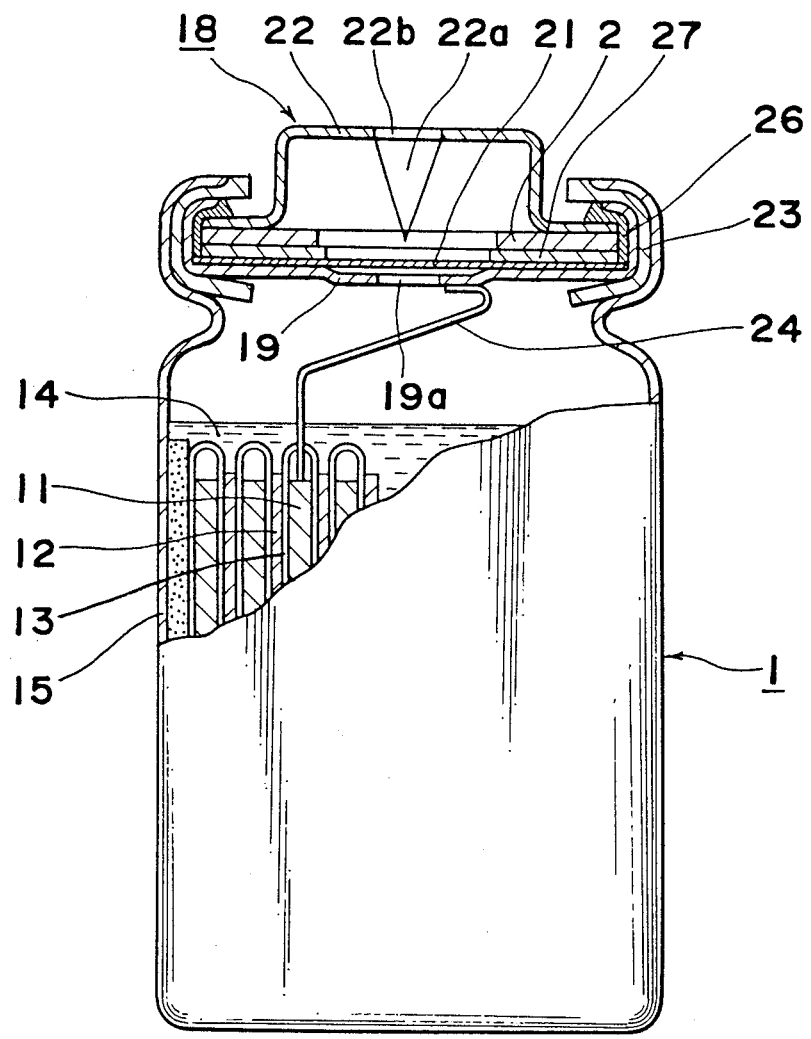
FIG. 1 is a partial cross sectional view of a conventional cylindrical organic electrolyte battery with a PTC device.

A battery as shown in FIG. 1 was prepared as the comparative example 1 in which the PTC device 2 was installed in the sealing member 18.

Namely, a circular metal plate 27 0.2 mm thick 14 mm outer diameter and 5 mm inner diameter and a circular PTC device of 0.6 mm thick, 13.1 mm outer diameter and 5.5 mm inner diameter were disposed on the flexible thin sheet 21, covering the outer cylindrical surfaces of the metal plate 27 and the PTC device 2 by an insulation packing 26. Further, the PTC device 2 was installed in the sealing member 18, insulating the sealing plate 19 and the terminal plate 22 by the insulation packing 26. Then the opening of the battery case 15 was sealed by the sealing member, whereby the cylindrical organic electrolyte battery with a PTC device was made.

In the battery of the comparative example 1, in order to cause the battery current to flow through the PTC device 2, the insulation packing 26 is excluded between the periphery of the flexible thin sheet 21 and the periphery of the sealing plate 19, as shown in FIG. 1 (it is noted that in the embodiments of the battery according to the present invention, the circular insulation packing 26 is disposed between the periphery of the flexible thin sheet 21 and the periphery of the sealing plate 19, since the PTC device 2 is not assembled in the sealing member 18). As a result, the battery current flows through the positive electrode 11, lead member 24, sealing plate 19, flexible thin sheet 21, metal plate 27 PTC device 2 and the terminal plate 22. Since the PTC device 2 is a flat plate, the flange portion of the terminal plate 22 must be shaped as a flat plate. Such a structure that the flange portion of the terminal plate must be flat and the insulation packing is not present between the flexible thin sheet 21 and the sealing plate 19 causes deterioration of the tight sealing of the sealing member 18 and the sealing property of the battery.

In the comparative example 1, the battery 1 is the same as the battery 1 in the embodiment 1 except that the PTC device 2 and the related parts are installed in the sealing member 18. Also, the positive electrode 11, negative electrode 12, separator 13 and the electrolyte 14 are the same as to those in the embodiment 1.

Fifty pieces of batteries of the respective embodiments 1 to 3 and the comparative example 1 were provided for the test. They were stored for 60 days at 60° C., and then leakage of the solution of batteries was examined. The result is shown in the table 1.

TABLE 1

|  | the number of battery from which the battery solution leakage occurred |
|---|---|
| Embodiment 1 | 0 |
| Embodiment 2 | 0 |
| Embodiment 3 | 0 |
| Comparative Example 1 | 6 |

As shown in the table 1, leakage of the battery solution occurred in six batteries of the comparative example 1. But leakage of the battery solution never occurred in the batteries of the embodiments 1 to 3 of the present invention. The leakage occurred in the batteries of the comparative example 1 partly because the sealing of the sealing member deteriorated because the PTC device was disposed in the sealing member.

At the time of preparing the batteries of the comparative example 1, after the sealing member was assembled, the internal resistance of the respective PTC devices in the sealing members was measured. Among 50 assemblies of the sealing member, there were three assemblies of the sealing member in which internal shortcircuiting of the PTC device occured. To the contrary, none of the PTC devices showed internal shortcircuiting at the time of assembling of the sealing members.

In the cylindrical organic electrolyte battery with a PTC device of the embodiments 1, 2 and 3, in order to use the PTC property, in the negative electrode of the battery another metal layer $2b2$ on which the metal plate 3 is not provided is connected to the external terminal or external lead. In the positive electrode, the terminal plate 22 is connected to the external lead member, whereby the electric power can be used in a similar manner as used in the prior art.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. In a cylindrical organic electrolyte battery with a PTC device, said PTC device essentially consisting of a PTC resin layer, with metal layers formed on both opposite surfaces of the resin layer, the improvement comprising a metal plate, which is larger than the PTC device, one end portion of the metal plate being bonded to one of the metal layers of the PTC device with another end portion of the metal plate being bonded to the bottom of said battery.

2. In a cylindrical organic electrolyte battery with a PTC device, said PTC device essentially consisting of a PTC resin layer, with metal layers formed on both opposite surfaces of the resin layer, the improvement comprising a metal plate, one end portion of the metal layer being bonded to one of the metal layers of the PTC device with another end portion of the metal layer being bonded to the bottom of said battery and the metal plate being folded at the intermediate portion of the metal plate.

3. In a cylindrical organic electrolyte battery with a PTC device, said PTC device essentially consisting of a PTC resin layer, with metal layers formed on both opposite surfaces of the resin layer, the improvement comprising a metal plate having a slit extending in one direction at the central portion in terms of any one of the longitudinal direction and lateral direction, with one half portion of the metal plate, divided along the slit, being bonded to one of the metal layers of the PTC device and the other half portion of the metal plate being bonded to the bottom of said battery.

* * * * *